United States Patent [19]

Hassoun et al.

[11] Patent Number: 5,737,757

[45] Date of Patent: Apr. 7, 1998

[54] CACHE TAG SYSTEM FOR USE WITH MULTIPLE PROCESSORS INCLUDING THE MOST RECENTLY REQUESTED PROCESSOR IDENTIFICATION

[75] Inventors: Joseph Hani Hassoun, Roseville, Calif.; Michael L. Ziegler, Whitinsville, Mass.; Robert D. Odineal, Roseville, Calif.

[73] Assignee: Hewlett-Packard Company, Palo Alto, Calif.

[21] Appl. No.: 787,984

[22] Filed: Jan. 23, 1997

Related U.S. Application Data

[63] Continuation of Ser. No. 621,318, Mar. 25, 1996, abandoned, which is a continuation of Ser. No. 236,541, May 3, 1994, abandoned.

[51] Int. Cl.⁶ .................................................. G06F 12/06
[52] U.S. Cl. .......................... 711/145; 711/121; 711/156
[58] Field of Search ........................... 395/447, 448, 395/470, 471, 472, 477, 478, 483; 711/120, 121, 143, 144, 145, 150, 156

[56] References Cited

U.S. PATENT DOCUMENTS

| | | | |
|---|---|---|---|
| 4,598,362 | 7/1986 | Kinjo et al. | 395/250 |
| 4,959,777 | 9/1990 | Holman, Jr. | 370/67 |
| 4,989,131 | 1/1991 | Stone | 395/375 |
| 5,067,071 | 11/1991 | Schanin et al. | 395/275 |
| 5,197,146 | 3/1993 | LaFetra | 395/472 |
| 5,230,070 | 7/1993 | Liu | 395/425 |
| 5,237,673 | 8/1993 | Orbits et al. | 395/425 |
| 5,297,269 | 3/1994 | Donaldson et al. | 395/472 |
| 5,303,362 | 4/1994 | Butts, Jr. et al. | 395/448 |
| 5,313,609 | 5/1994 | Baylor et al. | 395/425 |
| 5,319,766 | 6/1994 | Thaller et al. | 395/425 |
| 5,388,224 | 2/1995 | Maskas | 395/325 |
| 5,490,261 | 2/1996 | Bean et al. | 395/448 |

OTHER PUBLICATIONS

C. K. Tang, Cache System Design in The Tightly Coupled Multiprocessor System, Jun. 1976, pp. 749–753.

*Primary Examiner*—Eddie P. Chan
*Assistant Examiner*—Hiep T. Nguyen

[57] ABSTRACT

A shared memory multiprocessor computer system in which one or more processor modules and/or input/output modules have cache memories. The main memory controller for each main memory of the system maintains a duplicate cache tag array containing current information on the status of data lines from the main memory that are stored in the cache memories. Thus, coherency checks can be performed directly by the main memory controller. This eliminates the need for each processor having a cache memory to perform a separate coherency check and to communicate the results of its coherency checks to the main memory controller, and thereby reduces delays associated with processing coherent transactions.

4 Claims, 2 Drawing Sheets

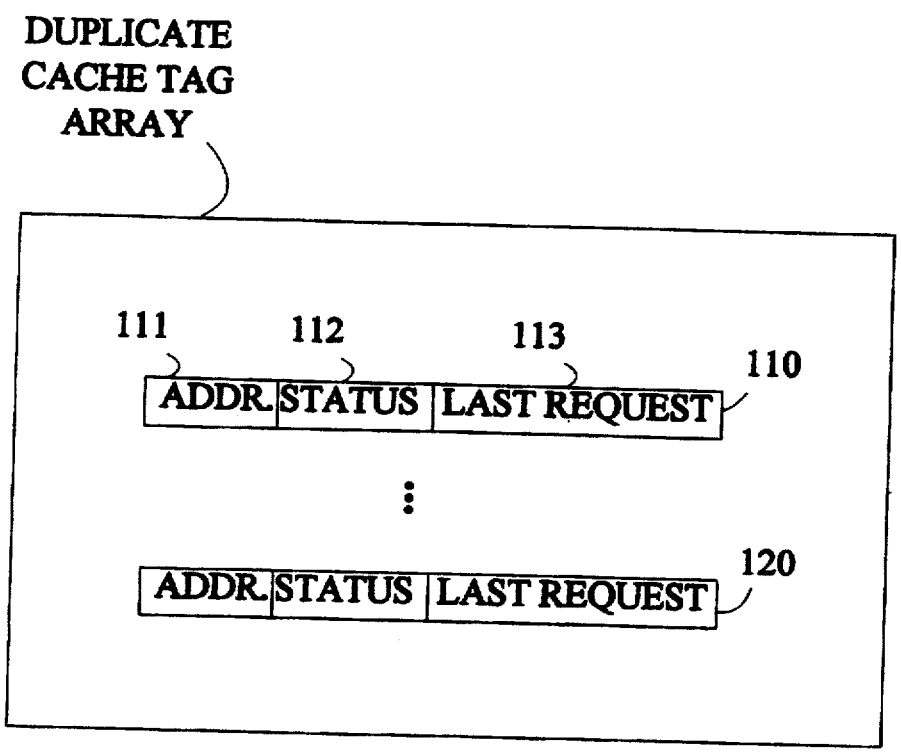
FIG._2

CACHE TAG SYSTEM FOR USE WITH MULTIPLE PROCESSORS INCLUDING THE MOST RECENTLY REQUESTED PROCESSOR IDENTIFICATION

This is a continuation of application Ser. No. 08/621,318 filed on Mar. 25, 1996, now abandoned, which is a continuation of application Ser. No. 08/236,541 filed on May 3, 1994, now abandoned.

FIELD OF THE INVENTION

The present invention relates to memory systems, and more particularly to shared memory multiprocessor systems in which one or more processors has a cache memory.

BACKGROUND OF THE INVENTION

Computer systems commonly have a plurality of components, such as processors, memories, and input/output devices. The components commonly are grouped as component modules, each of which may contain one or more processors, memory, and/or input/output devices. Component modules generally communicate with one another in the form of "transactions" such as conventional "read" and "write" transactions. For example, in a typical read transaction, one module will send signals to another module identifying data that it needs to obtain and requesting that the identified data be sent to it. The responding module then processes the request and returns the data.

In many computer systems, software running on the system is executed by two or more main processor modules that share one or more main memories. Systems of this type are often referred to as "shared memory multiprocessor" systems.

In shared memory multiprocessor systems, transactions generally are transferred among processor modules and the main memory modules on a shared memory interconnect, such as a conventional shared bus or a conventional cross bar switch. Transactions are transmitted over the shared memory interconnect during "cycles," each cycle being a period of time during which a limited number of transactions can be transferred on the shared memory interconnect. In a crossbar switch, each module is ordinarily entitled to place a transaction on the switch and receive a transaction from the switch during each cycle. This contrasts with conventional shared buses, in which only a single module is entitled to send a transaction on the bus during a given cycle.

Many conventional shared memory interconnects accommodate "split transactions." In split transactions, a response need not immediately follow a request. For example, a module may send a read transaction to another module on a crossbar switch during a given cycle. The other module may be busy performing other tasks for one or more cycles before it can process the read transaction. Eventually, the responding module will process the transaction and return the requested data during some future cycle. To correlate request transactions with their responses, each request transaction generally contains a transaction identification code that identifies the module initiating the transaction and distinguishes the transaction from other issued by that module. Response transactions generally are sent with the transaction identification code so that the response can be correlated with the request transaction. For example, data returned in response to a read transaction will identify the particular read transaction for which the data is being returned In shared memory multiprocessor systems, the main processors generally are coupled directly to the shared memory interconnect. Each main memory generally is coupled to the shared memory interconnect through a separate main memory controller. If the system has more than one main memory, each memory contains a mutually exclusive set of data addresses. If a processor is to read data from a main memory or write data to a main memory, it must communicate with the main memory controller for that memory.

In addition to main memories within a system, each processor module may also have a cache memory, which stores recently used data values for quick access by the module. Ordinarily, a cache memory stores both the recently used data and the addresses where these data items are stored in the relevant main memory. When the module seeks data from an address in a main memory, it requests that data from its cache memory using the address associated with the data. The cache memory checks to see whether it holds data associated with that address. If so, the cache memory returns the requested data directly to the processor. If the cache memory does not contain the desired information (i.e., if a "cache miss" occurs), a regular memory access ordinarily occurs. Cache memory is typically useful when main memory (generally RAM) accesses are slow compared to the microprocessor speed. Cache memory is faster than main RAM memory.

In the case of a shared memory multi-processor system in which each processor has a cache memory, the situation is somewhat more complex than for single processor systems having a cache memory. In a multiprocessor system, the current data corresponding to a particular main memory address may be stored in one or more cache memories, and/or in a main memory. The data in a cache memory may have been operated on by a processor, resulting in a value that is different from the value stored in main memory. Thus, a "cache coherency scheme," must be implemented to assure that the current data value for any address is provided independent of where that data value resides.

Typical coherency schemes involve a substantial amount of communication among modules that can introduce unnecessary delays into the computer system. In a typical coherency scheme, when data is requested by a module, each module having a cache memory is notified that is must perform a "coherency check" of its cache memory to determine whether it has data associated with the requested address and reports the results of its coherency check. The module must then perform the coherency check and report the results. Notification of the modules that coherency checks must be performed and reporting of the results by the modules can each result in processing delays.

In addition to reporting whether it has the requested data in its cache memory, each module generally reports the status of the data stored in its cache memory. For example, a module may report that it has a copy of the data and its copy is "private" (i.e., the data is only available for use by that module) or that the data is "shared" (i.e., the data may reside in more than one cache memory at the same time). A module may also report whether its data is "clean" (i.e., the same as the data associated with the same address stored in main memory) or "dirty" (i.e., the data has been operated on after it was obtained). Ordinarily, only one private-dirty copy of data is permitted at any given time. Generally, coherency status information for a particular data line stored in a cache memory is stored in a set of fields known as a "cache tag" for that data line.

A "coherent transaction" is any transaction that requires a check of all memories to determine the source of the data to be delivered to the requested processor. Coherent transactions generally can be issued during any available cycle of the shared memory interconnect. Some modules, however, may be busy internally and unable to immediately perform a coherency check for the transaction and cache coherency checks may take several cycles to complete. To accommodate the rate at which coherent transactions can be issued, modules sometimes have a cache coherency queue for storing coherent transactions until a coherency check can be performed. Depending on the rate at which coherency checks are performed, a large number of coherent transactions may be stored in a particular module's coherency queue, holding up execution of the transaction for a relatively long period of time.

The results of the coherency checks performed by each module are analyzed and the most current data is provided to the module that requested the data. For example, if no cache memories have a copy of the requested data, the data will be supplied by main memory. If a module has a private-dirty copy, it is either returned to a main memory controller that supplies the data or it is supplied directly to the requesting module in a cache to cache copy. When the data is supplied, each module typically updates the status of the data in its cache memory. For example, if a private copy of data is supplied to a particular module, other modules will ordinarily mark their copies of that data, if any, as invalid.

Accordingly, there is a need for a memory system having a main memories and cache memories that provides for cache coherency checking without undue delays.

SUMMARY OF THE INVENTION

An object of the present invention is, therefore, to provide an improved coherent memory system.

Another object of the present invention is to provide a memory system having a main memory and cache memories that provides for cache coherency and does not add excessive delays to coherent transactions.

These and other objects of the present invention will become apparent to those skilled in the art from the following detailed description of the invention and preferred embodiments, the accompanying drawings, and the appended claims.

Broadly stated, the present invention encompasses a duplicate cache tag memory system. The memory system has a main memory controller for supplying data in response to transactions received by the main memory controller. The memory system also has two or more modules, each having a cache memory for storing data supplied to the module by the main memory controller. Each module sends transactions to the memory controller to request data needed by the module that is not stored in the cache memory of the module.

The memory system also includes a cache tag array coupled to the main memory controller. The cache tag array includes a cache tag corresponding to each data line stored in one of the cache memories of the modules. The cache tag for a data line specifies the module that most recently requested the data line from the main memory controller.

In the preferred embodiment, the cache tags also specify whether the relevant data line is held private or shared.

BRIEF DESCRIPTION OF THE DRAWINGS

FIG. 2 is a more detailed block diagram of the duplicate cache tag arrays shown in FIG. 1.

DETAILED DESCRIPTION OF THE INVENTION AND PREFERRED EMBODIMENTS

Figure 1:
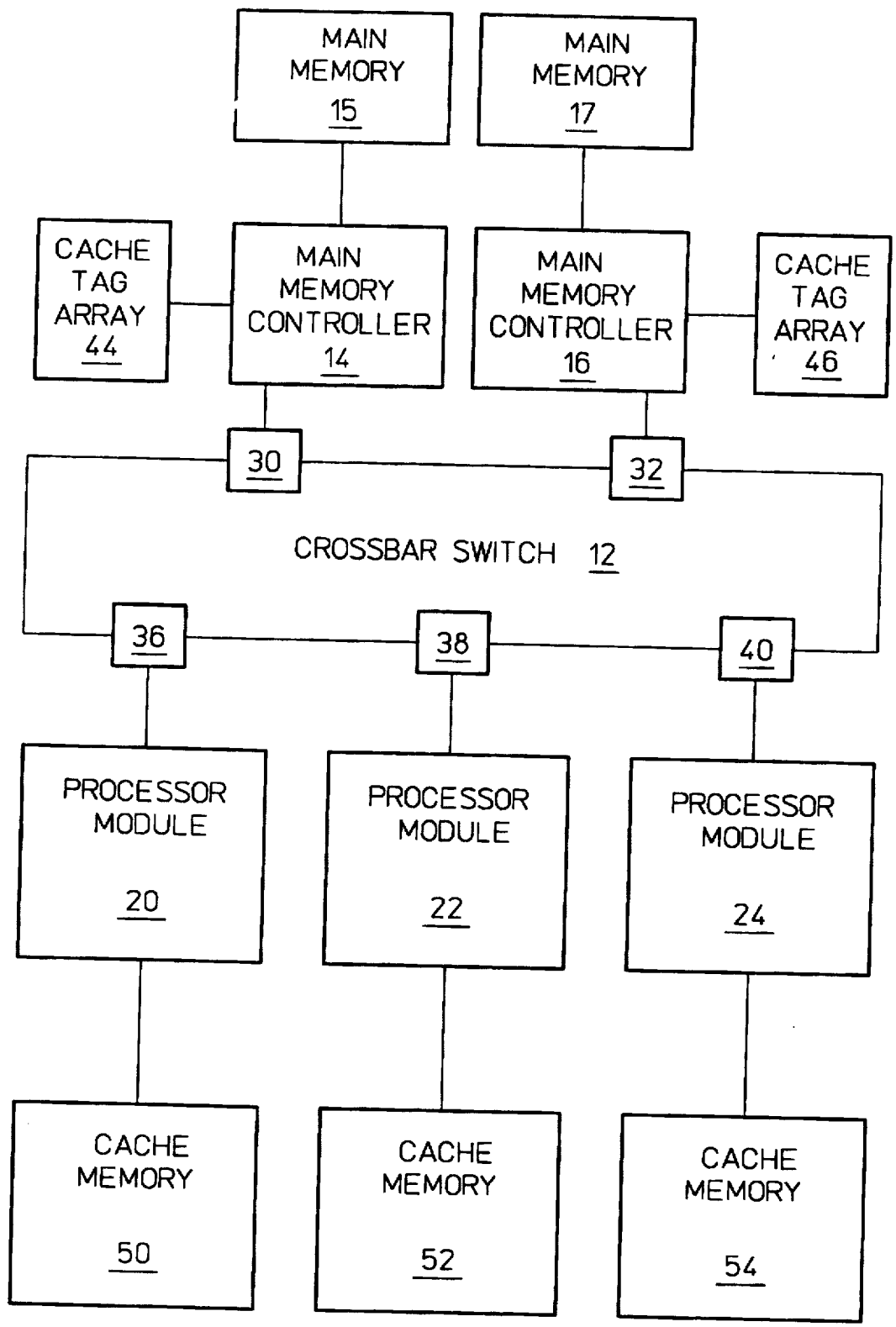
FIG. 1 is a block diagram illustrating one embodiment of a computer system utilizing a duplicate cache tag memory system according to the present invention.

The present invention encompasses an improved memory system for a shared memory multiprocessor computer system in which one or more processor modules and/or input/output modules have cache memories. According to the present invention, the main memory controller for each main memory maintains a duplicate cache tag array containing current information on the status of data lines from that main memory that are stored in the cache memories. Thus, coherency checks can be performed directly by the main memory controller. This eliminates the need for each processor having a cache memory to perform a separate coherency check and to communicate the results of its coherency checks to the main memory controller, and thereby reduces delays associated with processing coherent transactions.

A computer system utilizing a memory system according to the present invention is shown at 10 in FIG. 1.

Computer system 10 is a multiprocessor computer having a crossbar switch 12 and a plurality of components coupled to crossbar switch 12. The components include main memory controllers 14 and 16, input/output module 18, and processor modules 20, 22, and 24. The components send transactions to one another on crossbar switch 12.

Transactions are received by and sent from crossbar switch 12 during cycles. Each memory controller, input/output module, and processor module is entitled to place a transaction on crossbar switch 12 and receive a transaction from crossbar switch 12 during each cycle.

Each transaction placed on the crossbar switch includes transaction identification information, or a transaction identification code, that identifies the module to which the transaction is directed and distinguishes the transaction from other pending transactions issued by that module. The transaction also identifies the responding module to which the transaction is sent. The crossbar switch directs the transactions received during a given cycle to the responding modules.

To accommodate burst transaction issue rates greater than the speed at which transactions can be processed by responding modules, crossbar switch 12 includes queues associated with each module. Transactions being delivered by crossbar switch 12 to a module are placed in the queue associated with each module and sent to the module from the queue in first-in, first-out ("FIFO") order. Queues 30, 32, 36, 38 and 40 are associated, respectively, with main memory controllers 14 and 16, and processor modules 20, 22, and 24.

To accommodate the case in which more than one module sends transactions to a particular module during a given cycle, each module is assigned a predetermined priority. Transactions placed on the crossbar switch in the same cycle and directed to the same module are placed in the responding module's queue in an ordered defined by the priority of the sending modules. Thus, transactions received by the crossbar switch during a single cycle and directed to a receiving module sill be delivered to the receiving module during separate cycles.

Main memory controllers 14 and 16 are responsible for reading information from the main memories 15 and 17, respectively, and storing information in their respective main memories in a conventional manner. Main memory controllers 14 and 16 interface with memories 15 and 17 either directly or through conventional buses.

Processor modules 20, 22, and 24 are the main processors for computer system 10. Software for the system may execute simultaneously on all processors.

Processor modules 20, 22, and 24 include cache memories 50, 52, and 54, respectively. Recently used data is stored in cache memories 50, 52, and 54 along with the main memory address for the data and information relating to the coherency status or the data. The main memory address and coherency information can be viewed as being "cache tags" associated with each data line stored in the cache.

In the preferred embodiment, the status of each cache line (i.e., a copy of a dataline that is stored in a cache memory) is defined in one of five ways: "Invalid", "Private", "Shared", "Private-Pending", "Shared-Pending." A "private" line is one that is allowed to reside in the cache memory of only one module and to be used only by that module. If a module holds a data line private, the module may use the data line in any way as it represents the current value of the data. A "shared" line is one that is allowed to reside in more than one module's cache at the same time. In order for the current value of a data line marked shared to be changed by a module, the shared copies held by other modules must be marked invalid and the module must obtain the data line private. "Invalid" indicates that the data should not be used. The status of private-pending or shared-pending are explained below.

In addition to the cache tags of each processor module, each main memory controller contains a duplicate cache tag array that stores the current status of each cache line related to that main memory that is held by the processor modules. Duplicate cache tag array 44 is associated with main memory controller 14. Duplicate cache tag array 46 is associated with main memory controller 16.

The duplicate cache tag array for each main memory contains a "duplicate cache tag" corresponding to the cache tag associated with each data line from that main memory that is stored in a cache memory. Exemplary duplicate cache tags are shown at 110 and 120 in FIG. 2. The duplicate cache tag includes the main memory address 111 associated with the data and the coherency status 112 of the cache line. The duplicate cache tag also contains information 113 identifying the processor that has each data line or the transaction identification code for a processor that has requested the line. Thus, at any given time, each main memory has access to a duplicate cache tag array having the current cache coherency status for each data line associated with that main memory. There is no need for each module to perform a cache coherency check for coherent transactions and report the results to the main memory controllers.

It should be noted that a "duplicate cache tag" will not be a precise copy of the relevant cache tag. Rather, the duplicate cache tag is a duplicate only in the sense that it should include all coherency status information contained in the actual cache tag or, as will be explained below, more current information.

When a module needs a copy of a particular data line, it places a read transaction requesting that data line on the crossbar switch. The read transaction includes a transaction identification code and also specifies whether a shared copy or a private copy of the data is desired. A read-private transaction is a request for a private copy of data and a read-shared transaction is a request for a shared copy of data. The read transaction is directed to the main memory controller for the main memory that contains the specified memory address.

When a main memory controller receives a read transaction, it checks the duplicate cache tag array to determine whether the data line is held in a cache memory and the coherency status of the line. If no cache memory contains the data line, the main memory controller supplies the line from main memory to the requesting module.

If the line is held shared in one or more cache memories, the main memory controller supplies the data line from main memory. If the data is requested shared (i.e., by a read-shared transaction), the data is simply sent to the requesting module. If the data is requested private (i.e., by a read-private transaction), the main memory controller supplies the data from main memory and sends purge (i.e., invalidate) transactions to each module indicating that the modules should mark their shared copy of the data as invalid. In some embodiments of the present invention, the main memory controllers may keep a record of all the modules that have a shared copy of a given data line. In such embodiments, the main memory controller need only send purge transactions to the modules that have a shared copy of the data line.

If the data line is held private in a module's cache memory, the main memory controller sends a flush back (i.e., data return) transaction to the relevant module along with the transaction identification code for the read transaction requesting the data. In response to the flush back transaction, the module marks its cache tag for the line as invalid and returns the line to the requesting main memory controller along with the transaction identification code. When the line is received by the main memory controller, it supplies the line to the requesting module and updates the relevant address in main memory.

When it sends the flush back transaction to the relevant module, the main memory controller updates the status of its duplicate cache tag to reflect the requesting module as the owner of the data line an to indicate that the ownership is pending, that is the data has not yet been sent to the owner of the line. If the data line was requested private, the status is recorded as pending private. If the data line was requested shared, the status is recorded as pending shared.

Assuming no transactions requesting the data are received from other modules, the duplicate cache tag is again updated when the data is received by the main memory controller in response to the flush back. If the data line was requested private, the duplicate cache tag is updated to reflect a private status, rather than private pending, and the data is sent to the requesting module. If the data line was requested shared, the duplicate cache tag is updated to reflect a shared status, rather than pending shared, and the data is sent to the requesting module.

If a transaction requesting the data is received from another module before the data line is received in response to the flush back, a somewhat different treatment is necessary. As noted, at the time the flush back is sent, the duplicate cache tag is updated to reflect the requesting module as the current owner and the transaction identification code is sent with the flush back. The transaction identification code is also included with the data when the data is sent back to the main memory controller. For the reasons explained below, this allows for the case in which multiple requests for the same data line are pending.

When the main memory controller receives a second request for data, the duplicate cache tag for the data has already been marked with a pending status based on the first request for the data. At the time of the second request, the duplicate cache tag is updated to reflect the new requesting module and whether the data was requested private or shared by this new module. If the first requesting module requested the data private, a flush back transaction is sent to the first requesting module along with the transaction identification code identifying the second request for the data. If the first requesting module requested the data shared, a purge transaction is sent to the first requesting module. The first requesting module will act on these transactions after it has received the requested data and used it once.

When the data is received by the main memory controller in response to the flush back for the first data request, the duplicate cache tag will already have been updated to reflect the second data request. As noted above, however, the data is returned to the main memory controller with the transaction identification code for the first request. Thus, the main memory controller is able to properly direct the data. When the data is received by the main memory controller, it therefore sends the data to the first requesting module based on this information. Additionally, if the first requesting module is receiving the data shared, the data is also sent to the second requesting module.

If the first requesting module requested the data private, a flush back transaction will have been received by the first requesting module before the data is received. This out-of-order command sequence is used to indicate to the first requesting module that the first requesting module may use the data once and then must send the data back to the main memory controller.

If the first requesting module requested the data shared, a purge transaction will have been received by the first requesting module before the data is received. This out-of-order command sequence is used to indicate to the first requesting module that it may use the data once and then must mark its copy invalid.

If a third or subsequent request is received for previously requested data, the same procedure is used. The duplicate cache tag is updated to reflect the most recent request for the data. A flushback or purge transaction is sent to the previous requestor, depending on whether the previous requestor requested the data private or shared. If the previous requestor requested the data shared, the data is sent to both the previous requestor and the more recent requestor when it received by the main memory controller.

As an example of the operation of the present invention, consider the case of computer system 10. Assume that each cache tag for cache memories 50, 52 and 54 is initially marked invalid. Each duplicate cache tag will therefore also be marked invalid.

During one cycle of crossbar switch 12, processor 20 sends a read private transaction to main memory controller 14 indicating that it seeks to obtain a private copy of a data line "A." Since data line A is stored only in main memory 15, main memory controller 14 supplies data line A to processor module 20 during a subsequent cycle and updates duplicate cache tag array 44 to indicate that data line A is held private by processor module 20.

Processor module 20 receives data line A. Data line A is stored in cache memory 50 along with a cache tag indicating that the data is held private. Processor module 20 is free to alter the value of data line A in its cache memory 50.

During a subsequent cycle, module 22 sends a read private transaction to main memory controller 14 indicating that it seeks to obtain a private copy of data line A. Main memory controller 14 checks duplicate cache tag array 44 and determines that line A is held private by processor module 20. Main memory controller 14 sends a flush back A (or yield A) transaction to processor module 20 requesting that module 20's private copy of A be sent back to main memory controller 14. The transaction identification code indicating the read private transaction sent by processor module 22 is also sent to processor module 20 along with the flush back transaction. Main memory controller 14 also updates duplicate cache tag array 44 to indicate that processor module 22 owns data line A private pending.

When processor module 20 receives the flush back transaction, it sends data line A to main memory controller 14 along with the transaction identification code for the read private transaction of processor module 22 and marks its copy of line A invalid.

Assuming that no further requests for data line A were received, when main memory controller 14 receives data line A, it sends data line A to processor module 22 along with the transaction identification code, and updates duplicate cache tag array 44 to indicate that data line A is held private by module 22.

Now consider the case in which processor module 24 had requested a shared copy of data line A before data line A was received by main memory controller 14 from processor module 20. In this case, when module 24's read-shared transaction is received, the duplicate cache tag for data line A is updated to reflect module 24 as the owner of data line A with the status of "pending shared." A flush back is sent to module 22 along with the transaction identification code for the read-shared transaction sent by module 24.

When data line A is received by main memory controller 14 from processor module 20, it is sent to processor module 22 based on the transaction identification code returned with the data. Processor module 22 uses data line A once and then returns it to main memory controller 14 along with the transaction identification code for the read-shared transaction sent by module 24. Processor module 22 also marks its copy of data line A invalid.

When main memory controller 14 receives data line A from processor module 22, it sends data line A to processor module 24. It also updates the duplicate cache tag for data line A to indicate the it is held shared by processor module 24. Cache memory 54 for processor module 24 is updated with data line A and a cache tag indicating that the data is held shared.

It will be appreciated by those skilled in the art that main memories may be updated with the current value of data each time a private copy of the data is received by the relevant main memory controller.

The present invention has been described above using processor modules with cache memories for illustrative purposes only. It will be appreciated by those skilled in the art that the present invention is applicable to any other type of modules, such as an input/output module, having a cache memory.

Various modifications to the present invention will become apparent to those skilled in the art from the foregoing description and accompanying drawings. Accordingly, the present invention is to be limited solely by the scope of the following claims.

What is claimed is:

1. A memory system, comprising:

a main memory controller for supplying data in response to transactions received by said main memory controller;

a plurality of modules, each of said modules having a cache memory for storing data supplied to each of said modules by said main memory controller, each of said modules requesting data from said main memory controller by sending module generated transactions to said main memory controller; and a cache tag array coupled to said main memory controller, said cache tag array including a cache tag corresponding to each data line stored in one of said cache memories of said modules, there being a one-to-one correspondence between said cache tags and said data lines, said cache tag specifying the module that most recently requested said data line corresponding to said cache tag from said main memory controller independent of whether or not a previous request for said data line has been completed.

2. The memory system of claim 1, wherein said cache tag array includes information specifying the cache coherency status of each of said data lines that is stored in one of said cache memories.

3. The memory system of claim 1, wherein said memory controller sends a controller generated transaction requesting one of said data lines to one of said modules when said module receiving said controller generated transaction has a private copy of said data line and said data line has been requested by another of said modules, said controller generated transaction identifying said requested data line and said module requesting said data line, said module receiving said controller generated transaction returning said data line and a code identifying said module requesting said data line to said memory controller in a module generated transaction, and wherein said main memory controller directs said data line received in one of said module generated transactions to said module identified by said code when said memory controller receives data line from one of said modules in response to one of said controller generated transactions.

4. The memory system of claim 3, wherein said main memory controller, upon receipt of a transaction requesting a data line that is held private in a cache memory of a module, sends a data return transaction to said module causing said module to return said data line to said main memory controller, and said main memory controller thereafter sends said data line to said destination module, wherein said data return transaction includes said destination encoding and said data line is returned to said main memory controller with said destination encoding, and, wherein when one of said modules receives one of said controller generated transactions requesting one of said data lines before said module receives said data line requested in said controller generated transaction, said module is allowed to use said data line once upon receipt of said data line prior to responding to said controller generated transaction requesting said data line.

* * * * *